May 19, 1959     C. L. MARTIN     2,886,930
MEAT PATTY FORMING AND WRAPPING APPARATUS
Filed March 19, 1957     3 Sheets-Sheet 1
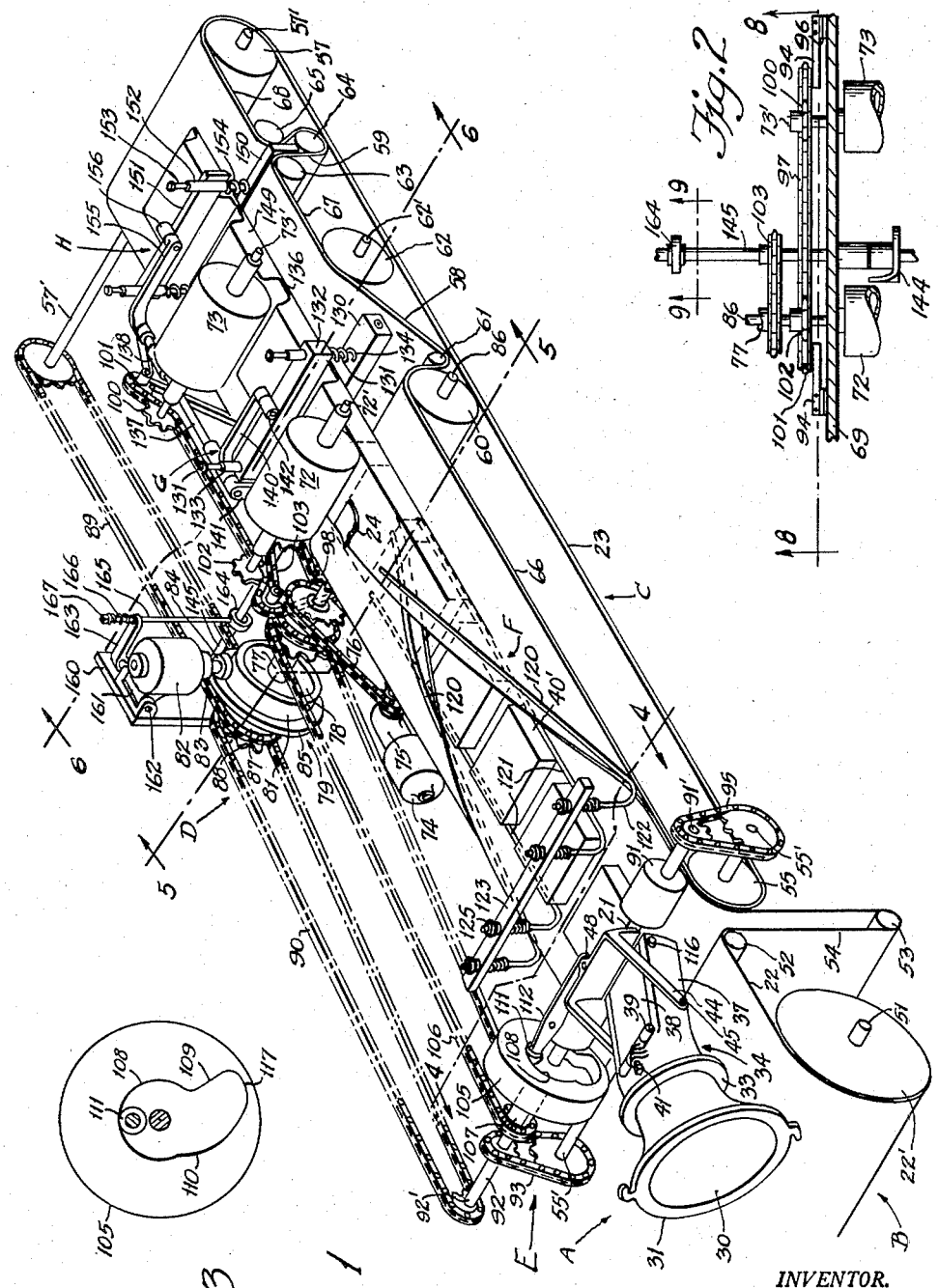
INVENTOR.
CLARENCE L. MARTIN
BY Sellers and Latta
-ATTORNEYS- May 19, 1959  C. L. MARTIN  2,886,930
MEAT PATTY FORMING AND WRAPPING APPARATUS
Filed March 19, 1957  3 Sheets-Sheet 2
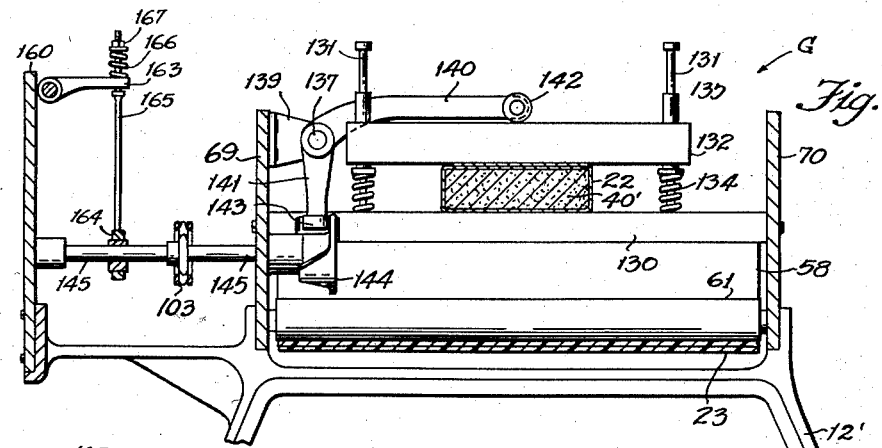
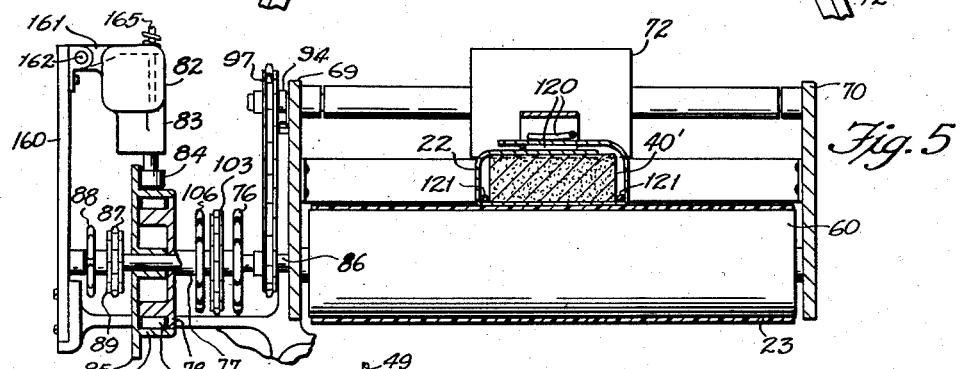
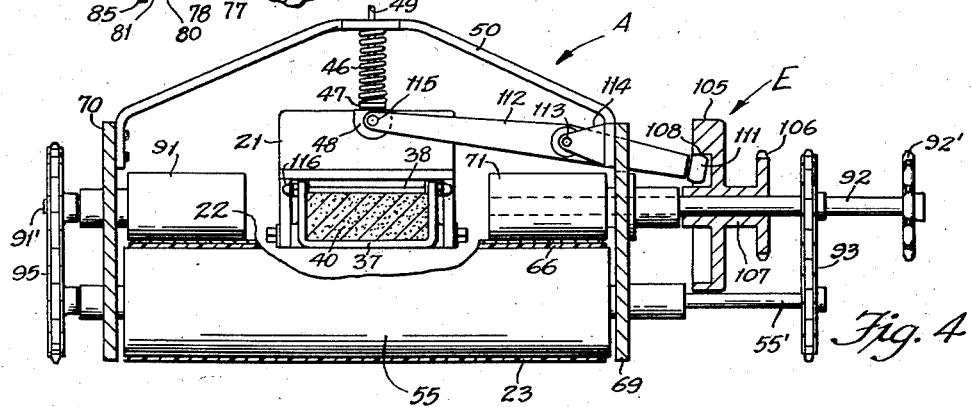
INVENTOR.
CLARENCE L. MARTIN
BY
Sellers and Latta
—ATTORNEYS—

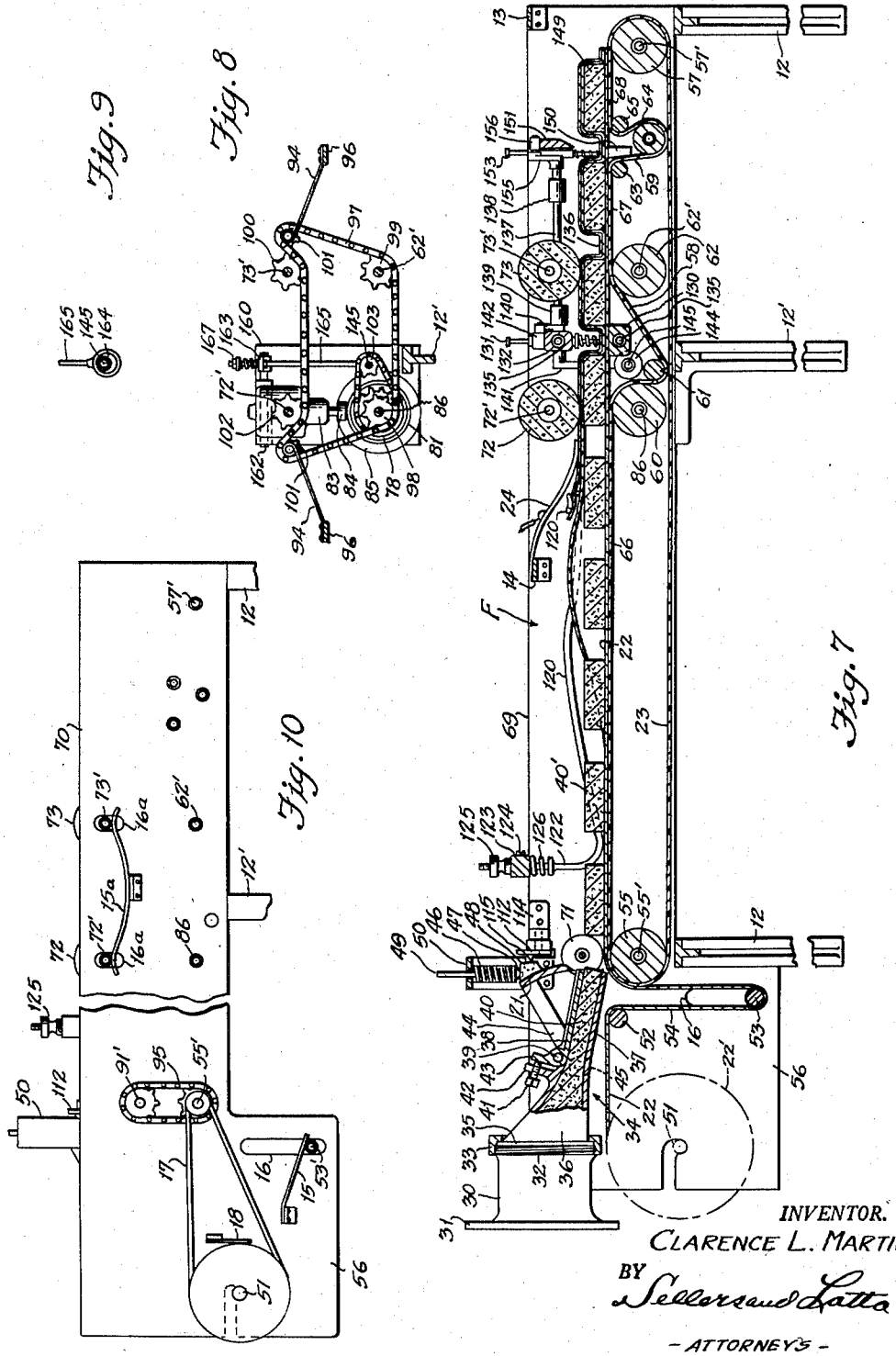

United States Patent Office 2,886,930
Patented May 19, 1959

2,886,930

MEAT PATTY FORMING AND WRAPPING APPARATUS

Clarence L. Martin, Van Nuys, Calif.

Application March 19, 1957, Serial No. 647,037

4 Claims. (Cl. 53—180)

This invention relates to apparatus for the further processing, into patties, etc., meat that has been ground in a conventional grinding machine, and has as its general object to provide an apparatus adapted to be attached to the discharge nozzle of the grinding machine, to form the issuing stream of ground meat into a flat ribbon of selected thickness (depending upon whether the final product is to be a relatively thin patty, or "steaklet" or a thicker body, to be sold as bulk hamburger or sausage, e.g. in half pound or one pound size); to sever the flattened ribbon into individual portions, and to wrap the severed portions in a preservative wrapper and seal the wrapper therearound.

A further object is to provide such an apparatus wherein the flattened ribbon of issuing meat is severed into individual patties at the outlet of the shaping nozzle of the apparatus, the patties are deposited upon a continuous ribbon of wrapper material, in spaced relation longitudinally of the ribbon, the sides of the ribbon are folded around the sides of the patties to constitute a continuous tubular wrapper which is sealed in tubular form, the areas of the wrapper bridging betwen the patties are flattened and sealed in the spaces between the patties to provide end sealed cells, and the webs between the cells are then severed to provide individual sealed packages of meat.

A further object is to provide such an apparatus wherein all of the processing steps referred to above are performed on an endless conveyor belt which finally delivers the completed packages at a discharge end remote from the shaping nozzle.

A further object is to provide an improved intermittent drive apparatus for driving the conveyor belt and feed rolls intermittently at normal and speed-up rates both of which can be varied between fast and slow limits while maintaining the same ratio between one another; and for operating a meat severing knife, an end forming and sealing electrode and a cut-off knife in synchronized relation to the conveyor operating movement.

A still further object is to provide such an apparatus wherein provision is made for arresting the conveyor and feed roll operation at a dead stop for a short interval immediately following the speed-up operation, so that the end sealing and package cut-off operations can be performed with the wrapper tube stationary. More specifically, the invention contemplates a drive mechanism incorporating an over-running clutch for transmitting normal slow drive to the conveyor and feed roll parts, a separate speed-up drive in direct driving relation to the driven part of the over-running clutch and bypassing the driving part thereof, whereby said driving part may idle behind the driven part during the speed-up operation, and wherein, at the end of the operation, the lost motion in the over-running clutch during the period in which the driving part overtakes the driven part and re-establishes the driving relation therewith, is sufficient to provide the period of arrested movement of the conveyor and feed roll parts.

Other objects will become apparent in the following detailed description of the invention, taken in connection with the appended drawings, wherein:

Fig. 1 is a perspective view of the arrangement of operative parts in a machine embodying my invention, the figure being schematic in that the frame structure is omitted in order to avoid obscuring the mechanism;

Fig. 2 is a fragmentary plan view of a portion of the feed roll and conveyor drive mechanism;

Fig. 3 is a detail sectional view showing in elevation the parting blade actuator cam;

Fig. 4 is a transverse sectional view of the machine taken on the line 4—4 of Fig. 1, illustrating the knife and the actuator mechanism for the latter;

Fig. 5 is a transverse sectional view of the machine taken on the line 5—5 of Fig. 1, looking in the opposite direction and showing the wrapper-folding mechanism and the speed-up drive mechanism;

Fig. 6 is a transverse vertical sectional view of the machine taken on the line 6—6 of Fig. 1 and illustrating the end warming and sealing unit, its actuator mechanism and the actuator for controlling the speed-up drive;

Fig. 7 is a vertical longitudinal sectional view of the machine;

Fig. 8 is a vertical longitudinal sectional view taken on the line 8—8 of Fig. 2 and showing the drive mechanism illustrated in that figure;

Fig. 9 is a detail sectional view taken on the line 9—9 of Fig. 2 and showing the speed-up motor control eccentric; and Fig. 10 is a fragmentary front side elevation of the machine.

BRIEF GENERAL DESCRIPTION OF APPARATUS

Referring now to the drawings in detail, and with particular reference to Fig. 1, I have shown therein, as an example of one form in which the invention may be embodied, a meat patty processing machine comprising a series of main operating units indicated generally by the following reference letters: (A) A nozzle for receiving the stream of ground meat delivered from the nozzle of a grinding machine and shaping it into a flat ribbon and having at its outlet a parting knife 21 for severing the ribbon into rectangular patties or cakes;

(B) A conventional supply roll unit B for delivering, from a roll, a wrapper film 22 in ribbon form;

(C) A conveyor and feed roll combination, including an endless conveyor belt 23 which supports the wrapper ribbon 22 upon which the severed portions of meat are deposited at the outlet of nozzle unit A;

(D) Conveyor and feed roll drive apparatus, for driving the parts C with the normal drive, the speed-up drive and the arrested operation referred to above;

(E) Mechanism for intermittently operating the knife 21 with a chopping movement;

(F) Folding mechanism for folding the sides of wrapper 22 around the meat patties and including a heated blade 24 for sealing the wrapper into a continuous tubular form;

(G) An end forming and sealing unit for separating the wrapper tube into a series of closed cells and sealing the wrapper between them;

(H) A cut-off unit for severing the wrapper web between said closed cells to provide a series of separate sealed packages of meat.

The machine may utilize any suitable frame structure. For example, it may have a pair of side frame plates 69 and 70 supported upon legs 12 and 12' and maintained in laterally spaced relation by the web portions of these legs and by cross members 13, 14, 50 and 123.

(A) Detailed description of nozzle unit

Nozzle Unit A includes a union 30 having at one end a flange 31 for attaching it to the outlet of the nozzle of a conventional meat grinding machine and having at its other end a male thread 32 for mating with an attachment collar 33 by means of which there may be attached to the union 30 any selected one of a series of shaping nozzles 34, each having a flange 35 for engagement by the attachment collar 33. Shaping nozzle 34 includes a throat section 36 which is progressively varied from circular cross section at flange 35 to rectangular cross section where it merges with a delivery trough 37 of rectangular channel section. A gate 38, in the form of a rectangular plate fitted in the opening in the top of trough 37 and cooperating with the latter to define a rectangular shaping bill, is hinged at 39 to trough 37 on a transverse axis so that the outer end of the gate may be adjusted vertically to determine the thickness of the ribbon of meat 40 that is discharged from the nozzle. The adjustment of the gate, and securing it in any selected position of adjustment, may be provided for by an adjustment screw 41 threaded through a lug 42 formed integrally with the throat portion 36 of the nozzle and engaging the short finger 43 formed integrally with the gate 38 at the hinge 39 thereof and projecting upwardly. A conventional lock nut (not shown) may be utilized if desired for setting the screw 41 in any adjusted position. In changing the setting from one for a thin patty to one for a thicker cake, it is only necessary to back off the screw 41 to the proper position, and the pressure of the meat in the nozzle will raise the gate 38 to the selected position for the necessary deeper opening.

The parting knife 21 is mounted to the nozzle by a pair of arms 44 and pivots 45 connecting the arms at their ends to the sides of the nozzle on a transverse horizontal axis so that the knife may chop downwardly, the end of the nozzle and the vertical cross sectional contour of the knife being developed on an arcuate contour constituting a segment of a cylinder having its axis coincident with the axis of pivots 45. Quick downward chopping movement may be effected by the action of a compression spring 46 acting through a plunger 47 against a boss 48 on knife 21, with a knuckle joint connection between the lower end of plunger 47 and boss 48, plunger 47 including a guide pin 49 extending loosely through an opening in the upper end of a bracket 50.

(B) Wrapper supply unit

Unit B may include any conventional means for rotatably supporting and driving a spindle 51 in the frame of the machine, so as to provide a rotatable support for a roll 22' of the wrapper film 22. The wrapper supply unit also includes a gravity take-up between the roll 22' and the conveyor C. From the roll 22', the wrapper film 22 proceeds forwardly beneath nozzle unit A and passes downwardly over an idler roll 52 rotatably supported in the frame of the machine. Thence the film passes upwardly around a floating roll 53 to provide a take-up loop 54 of varying depth, from which the wrapper film is carried onto the conveyor C, over the first conveyor roll 55. The ends of roll 53 may be confined between vertical aprons 56 of the frame (constituting downward extensions of side plates 69, 70) to prevent endwise displacement of the floating roll while leaving it free to shift vertically in accordance with the differential between the relatively uniform movement of roll 22' and the intermittent movement of conveyor 23, while constantly maintaining the correct amount of tension in the wrapper film, as determined by the weight of the roll 53, supplemented by the light yielding pressure of a pair of leaf springs 15, applied to the projecting end portions of bearing bushings on the ends of the shaft 53' of roll 53, sliding vertically in slots 16 in the aprons 56.

The constant drive of roll 22' may be effected by supplementing the pull of wrapper film 22 under the weight of the roll 53 by the drive of a slipping belt 17 travelling on pulleys on roll spindle 51 and on a shaft 55' of the conveyor mechanism, from which drive is transmitted, with a light braking action by a brake 18, which is overcome by the combined driving forces of belt 17 and wrapper web 22, the latter force being determined by the weight of roll 53 plus the yielding tension applied by springs 15 which, being positive rate springs, will gradually increase their loading as they are flexed upwardly, thereby increasing the net driving force to some extent and automatically regulating the drive in a manner to slightly speed up the feed from roll 22' whenever necessary to maintain the normal depth of the take-up loop 54. In the event shaft 53' bottoms in slots 16, belt 17, taking the full driving load, will slip to prevent slackening the film 22. As an alternative, the positive drive 17 could be eliminated and the weight of roll 53 and tension of spring 15 increased somewhat to provide the added pull required for maintaining the drive against the drag of the braking means, although the fluctuating nature of the pull on the film 22 presents some difficulty in utilizing this more common type of feed.

(C) Conveyor and feed roll mechanism

The unit C includes an endless conveyor belt 23 of reinforced sheet rubber or rubberized fabric, or equivalent material, travelling between end rolls 55 and 57. To accommodate the end sealing unit D and the cut-off unit H, the upper stretch of the belt is guided into a pair of dips 58 and 59 by a series of rolls as follows: for the dip 58, the belt travels downwardly over a roll 60, upwardly around an idler roll 61, and thence forwardly over a roll 62, the rolls 60 and 62 being relatively large rolls and the roll 61 being a small diameter roll adjacent the bottom stretch of the belt so as to provide ample free space in the dip 58 for the apparatus which will hereinafter be described. For the dip 59, the belt travels downwardly over a roll 63, thence upwardly around an idler roll 64 adjacent the lower reach of the belt, thence forwardly over a roll 65 to the terminal roll 57 at the delivery end of the machine. At their upper sides, the rolls 60, 62, 63, 65 and 57 are tangent to a common plane for several sections of the upper stretch of the belt, including a section 66 which provides an area for the operation of the wrapping folding F, a shorter section 67 which provides an area for transfer between the end sealing unit G and the cut-off unit H, and a terminal section 68 which conveys the separated packages away from the cut-off unit H and to any selected receiving tray or the like.

The rolls 55, 60, 62 and 57 are preferably all driven by the drive mechanism which will hereinafter be described in the next section of this specification.

Rolls 55, 57 and 60–65 inclusive, are provided with suitable mounting shafts (including shafts 55', 57', 86 and 62' for shafts 55, 57, 60 and 62) which are journalled in side frame members 69 and 70 of the machine (Figs. 4, 5 and 7).

In addition to the conveyor belt assembly, the feed mechanism includes a pair of axially aligned, laterally spaced feed rolls 71 and 91 engaging the wrapper 22 immediately above the conveyor roll 55, and a pair of soft rolls 72 and 73 of soft rubber (e.g. sponge rubber) or equivalent material for engaging the chain of wrapped patties after the wrapper has been folded around them, the roll 72 feeding directly into the end sealing unit B and the roll 73 feeding between the unit D and the cut-off unit H. The rolls 72 and 73 are pressure rolls, but the pressure exerted by them against the tops of the cells 149 of wrapped meat is a very light pressure.

Rolls 72 and 73 are mounted for vertically floating movement so that they may automatically adjust themselves to the thickness of the packages being formed, resilient supporting means being utilized to carry a portion of the weight of the rolls so that their pressure against the meat packages may be a relatively light pressure, insufficient to squash the packages. To this end, the shafts 72′ and 73′ of these rollers extend through vertical slots 16a. Yielding support for these shafts is provided, at one end thereof, by a light leaf spring 15a, and, at the opposite ends of the shaft, by leaf springs 15a which will be referred to hereinafter. Bearing bushings on the shafts 72′, 73′ may rest directly against the ends of the respective arms of spring 15a as shown in Fig. 10.

(D) Drive mechanism

Unit D includes a main drive motor 74 constantly transmitting drive through a reduction gearing 75 and a chain drive 76 to a tubular drive shaft 77 which in turn constantly transmits the drive to the driving part 78 of an overrunning clutch 79. From the driving part 78, the drive is transmitted intermittently through conventional clutch rollers 80 to the driven rim 81 of the clutch, the roller 80 operating between conventional cam faces on the driving part 78 (not illustrated because well known) and the cylindrical inner face of rim 81. The clutch is particularly characterized by arrangement of the rollers and the camming faces of the driving parts with relation to the driven rim 78 so that considerable lost motion is involved in reestablishing the drive through the clutch after it has been interrupted by the speed-up operation which will presently be described.

Intermittent speed-up drive is transmitted directly to the driven rim 81 of the overrunning clutch 79 from a second motor 82 driving, through a reduction gearing 83, a friction drive disc 84 which engages a flange 85 on driven rim 81. Driven rim 81 has a hub that is secured to main drive shaft 86 which extends through shaft 77, the latter being rotatably mounted thereon. Means is provided to swing the drive disc 84 out of engagement with the driven flange 85, to establish a slow drive stage of operation wherein drive is transmitted from motor 74 through drive shaft 77 and driving part 78, through the clutch 79 and from the driven part 81 thereof through the main drive shaft 86 to the various feed drives presently to be described. When the drive disc 84 is brought back into engagement with the flange 85, the driven rim 81 of the clutch is driven ahead of the driving part 78 and the drive then proceeds directly from the driven part 81 through the main drive shaft 86 to the several feed part drives at an accelerated rate, bypassing the drive shaft 77 which, however, continues to drive other parts at the slower speed. At the end of this speed-up stage, the driven shaft 86 and the several feed part drives cease rotating and remain stationary for the end-sealing and cut-off stage of operation.

Motor 82 has an integral bracket 161 in which is secured a shaft 162 by means of which the rotor is mounted for swinging movement transversely to the plane of clutch flange 85, between a driving position in which its driving disc 84 engages the flange 85 and a non-driving position in which it is moved out of contact with the flange 85. Shaft 162 is journalled in a bracket carried by a pedestal 160 forming part of the frame of the machine. To one end of shaft 162 is secured an arm 163. Cam shaft 145 is extended to a bearing on pedestal 160 in which its outer end is journalled. On the cam shaft 145, directly below the end of arm 163, is an eccentric 164, to which is attached a pitman rod 165 extending upwardly through an opening in the end of arm 163, a yielding driving connection between pitman rod 165 and arm 163 being provided by a coil spring 166 which encircles the projecting upper end of the rod 165 and is engaged between the arm 163 and a nut and washer assembly 167 threaded on the upper end of rod 165 and providing for adjustment of the loading of spring 166 so that the exact point of engagement of driving disc 84 with flange 85 may be suitably adjusted. As the cam shaft 145 rotates, the pitman rod 165 will alternately lift the arm 163 to shift the driving disc 84 away from flange 85 and then, in the downward movement of rod 165, will bring the driving disc 84 back into contact with the flange 85. Drive is transmitted from the shaft 86 to both ends of the conveyor through chain and sprocket drives including sprockets 87 and 88 fixed on the shaft 86, and chain and sprocket drives 89 and 90 to the shaft 57′ of terminal conveyor roll 57 and to the shaft 92 of the short upper feed roll 71, respectively. The conveyor roll 60 is mounted on main drive shaft 86 and therefore directly driven from the driven element 81 of the clutch 79. Drive to the forward conveyor roll 55 is transmitted from shaft 92 through a chain and sprocket drive 93 to the shaft 55′ of roll 55, at one end thereof. Drive to the other short top roller 91 may be transmitted through a chain and sprocket drive 95 from the other end of shaft 55′ up to the shaft 91′ of roll 91. Alternatively, by appropriate arrangement between the diameter of rolls 71, 91, and the height of shaft 92 with reference to nozzle 34, the shaft 92 may be extended across to roll 91, bridging above the ribbon of meat issuing from the nozzle 34, and thus the drive 95 may be eliminated.

Rolls 62, 72 and 73 are driven by a common drive chain 97 (Fig. 8) travelling around a sprocket 98 on drive shaft 86, around a sprocket 99 on roll shaft 62′, thence around a sprocket 100 on the shaft 73′ of roll 73, thence around a pair of idlers 101 above the shafts of the respective rolls 73 and 72 and around a sprocket 102 on the shaft of roll 72, and back to sprocket 98.

From drive sleeve 77, constant drive is transmitted through a chain and sprocket drive 103 for driving the actuator apparatus for units G and H, hereinafter to be described. In passing around sprockets 100 and 102, the chain engages the inner sides of the sprockets, whereas in passing around the sprockets 98 and 99 it engages the outer sides of the sprockets, thus providing the proper direction of rotation for the four rolls 60, 62, 72 and 73 as indicated by the respective arrows.

The drive arrangement shown in Fig. 8 provides a floating support for the driven ends of rolls 72, 73 in that the idler rollers 101 are journalled on studs mounted in the free ends of springs 94, the opposite ends of these springs being mounted to the frame member 69 by brackets 96 secured to the outer side thereof. The driven ends of the roll shafts 72′ and 73′ are supported by the sprockets 102 and 100 resting on the chain 97 which in turn is yieldingly supported by the idler sprockets 101 and springs 94, the latter being adapted to yield downwardly with a flexing action under the weight of the rolls 72, 73, until contact with the meat packages by the rolls 72, 73 is established.

(E) Meat parting knife actuator mechanism

The unit E for operating the knife 21 with a chopping action (Fig. 4) comprises a means for lifting the knife intermittently, compressing the spring 46 and thus cocking the apparatus for a chopping stroke which is executed by the spring 46 upon release of the knife for downward movement.

The means for thus lifting the knife comprises an internal cam 105 driven through a chain and sprocket drive 106 from the drive sleeve 77 to a sleeve 107 constituting the hub of cam 105 and rotatably mounted on the shaft 92. Cam 105 has an internal cam face including a dwell portion 108 of relatively small and substantially uniform radius, a steep release shoulder 109, and a rising portion 110 extending from the bottom of shoulder 109 back to the dwell portion 108 of the cam face. A follower roll 111, journalled on the end of a rocker arm 112, follows the cam face 108—110. Rocker arm 112 is pivoted, at 113 on a bracket 114 attached to frame member 69, for tilting movement generally in a vertical plane extending transversely of the machine between the cam 105 and the knife 21. At its end adjacent knife 21, arm 112 is provided with a trunnion 115 which has a ball and socket connection with boss 48 of the knife 21. Arm 112 is relatively thin and flexible in a direction parallel to the longitudinal axis of the machine, so that its end where pivoted to knife 21, may follow the arcuate downward movement of the knife.

In the operation of the parting knife 21, the cam 105, rotating in the direction indicated in Fig. 3, will hold the knife in the suspended, cocked position as roller 111 travels against the dwell portion 108 of the cam face. As the roller reaches the shoulder 109 it will rapidly descend to the bottom of the cam recess, allowing a correspondingly rapid downward movement of knife 21 under the push of spring 46, with a chopping action which is arrested by engagement of the knife mounting arms 44 against buffer knobs 116 on the sides of trough 37. Having descended to this position, the knife 21 functions as a gate to hold back the flow of meat from the nozzle 34 while the portion that has previously been discharged therefrom is moved ahead on the conveyor belt 23 in the speed-up operation thereof, thus producing a gap between that portion and the next portion to be discharged from the nozzle. This short interval of hold-back operation is provided for by a dwell face 117 in the cam, extending from the bottom of shoulder 109 to the beginning of the rising portion 110 of the cam face. At the end of this interval, the roller 111 travels rapidly up the steep rising face 110, thus lifting the knife 21 back to the cocked position shown in Fig. 1.

The meat, which has in the meantime been somewhat compressed in the nozzle 34, will then be ejected from the nozzle onto the wrapper film 22 and will travel forwardly with the conveyor belt 23 until the measured portion of meat has been deposited thereon, when the knife will again descend to sever that portion from the ribbon in the nozzle.

It will now be seen that the apparatus operates to deposit on the wrapper 22 a succession of longitudinally spaced rectangular patties of meat, indicated at 40' in Fig. 7.

(F) The wrapper folding unit

The wrapper folding unit F (Figs. 1, 5 and 7) comprises two pairs of flexible folding fingers 120 and 121 of flexible spring rod material, the rear ends of the rods being bent upwardly to provide shanks 122 which are mounted for vertical adjustment in a mounting bar 123 secured to and transversely bridging between frame members 69 and 70 above the plane of the wrapper 22. Set screws 124 are threaded through the bar 123 for engagement with the respective shanks 122 to lock the fingers in selected positions, and an adjusting nut 125 is threaded on the upper end of each shank and engages the bar 123 to determine the height of a respective finger. A coil spring 126 may be used between the lower side of bar 123 and a respective shank to effect downward movement of the respective folding finger in accordance with unthreading movement of the nut 125.

Fingers 121 are arranged to lie flatly against the wrapper film 22 and to maintain the central area thereof in contact with the conveyor belt 66, while fingers 120 are curved spirally upwardly and inwardly and in crossed relation as shown, to lift the side portions of the wrapper film and fold them around the sides of the meat patties 40' and against the upper faces thereof, with one side portion of the wrapper film being tucked beneath the other and said other portion being folded over the one. This folding is completed just ahead of the roll 72, where a heated sealing tongue 24 bears flexibly against the upper fold of the wrapper to seal it to the fold beneath. Thus there is formed a longitudinal seam which converts the wrapper film into a tube of rectangular section within which the meat patties are contained to provide a chain of connected patties which progresses toward the end sealing and cut off units G and H.

(G) End sealing unit

Unit G (Figs. 1, 6 and 7) includes an anvil jaw 130 the ends of which are secured to the respective frame members 69 and 70, jaw 130 being accommodated in the space defined in dip 58 of the conveyor belt. It is positioned to register directly beneath one of the gaps between a pair of meat patties 40' at the arrested-feed stage of operation. Anchored in and rising from the anvil jaw 130 are a pair of guide pins 131. A forming and sealing jaw 132 has a pair of guide sleeves 133 through which the guide pins 131 extend. Interposed between the lower side of forming jaw 132 and the anvil jaw 130, and encircling the guide pins 131, are coil springs 134 which, when the chain of enclosed meat patties is moving forwardly, will yieldingly support the forming jaw 132 in a raised position bridging above the path of such forward movement, as illustrated in Fig. 6. During the period of arrested forward travel, the jaw 132 is moved downwardly against a web of wrapper tube bridging the space between successive meat patties at a position between the jaws 130 and 132, until such web is pressed against the anvil jaw 130. The web is clamped between the jaws for a short interval while heat is applied to the web from the jaws, heated by heating elements 135 therein. Thus the upper and lower portions of the wrapper tube are sealed together to provide the end seal webs 136 which complete the sealing of the wrapper tube around the meat patties, thus producing a fully sealed meat package 149.

The downward movement of the upper jaw 132 is provided for by a shaft 137 journalled in brackets 138 and 139 attached to side frame member 69, the shaft 137 having secured thereto an arm 140 extending horizontally just above the upper level of jaw 132 and having an arm 141 projecting downwardly. A roller 142, journalled on the end of arm 140, bears against the upper face of jaw 132. A roller 143, journalled on the lower end of arm 141, bears against a face cam 144 which is mounted on a shaft 145 journalled in a bearing on side member 69 and projecting therethrough. To the other end of shaft 145 is secured the sprocket 103 described in section D hereof, whereby the cam 144 is rotated at a constant speed properly adjusted to the average speed of the conveyor rolls 60, 62 etc. The configuration of cam 144 is such as to effect rapid downward and return movements of jaw 132 and to maintain the jaws closed for the short interval of time required for the heat sealing operation, the total elapsed time in the end forming and sealing stage being a small fraction (e. g. between ¼ and ⅛) of the complete cycle of operations in forming one meat package.

(H) Cut-off unit

The cut-off unit H, best shown in Figs. 1 and 7, is in essence a parallel blade shear embodying a fixed blade 150 the ends of which are secured to the respective side frame members 69 and 70 in the gap defined by the dip 59 of conveyor belt 66; and a movable upper shear blade 151 which is mounted on blade 150 for vertical shearing movement in which the blade 151 shears downwardly against the forward face of blade 150, a cutting edge on the lower side of blade 151 piercing the web 136 between connected packages in the chain of packages 149, thus severing the foremost package from the chain and freeing it so that the terminal section 68 of the conveyor belt 66 will deliver it into a receiving tray or the like. Blade 151 is mounted on blade 150 by means of a pair of sleeves 152 secured to its rear face, a pair of guide pins 153 extending through the sleeves 152 and mounted in the blade 150, and a pair of coil springs 154 (Fig. 1) encircling the pins 153, engaged between the lower ends of sleeve 152 and the blade 150 and functioning normally to yieldingly support the blade 151 in the raised position shown in Fig. 1, in which a meat package 149 may pass thereunder to the position on terminal portion 68 of the conveyor belt, ready to be severed from the chain of packages.

The means for effecting downward movement of shearing blade 151 comprises a lever 155 mounted on the shaft 137 and having at its free end a roller 156 which bears against the upper face of blade 151. Arm 155 may be identical to arm 140. It will now be apparent that the operation of sealing unit G and shear unit H is a unison operation in which the jaw 132 and blade 151 are moved downwardly simultaneously by the common operating mechanism including cam 144, shaft 137, arm 140 and lever 155. The operations both take place in the interval of arrested conveyor movement, and the jaw 132 and blade 151 will both be raised simultaneously to clear the chain of meat packages for advancement one more step to another arrested position thereof, in which again there may be a simultaneous occurrence of an end forming and sealing operation at unit G and a cut-off operation at shear unit H.

RÉSUMÉ OF OPERATION

Prefatory to a general description of overall operation, it may be noted that the conveyor rolls 55, 57, 60 and 62, and the feed rolls 72 and 73, are of a larger diameter than the feed rolls 71 and 91, although it will be understood that by a suitable rearrangement, the rolls could all be made the same diameter. The diameter of feed rolls 72 and 73 may be the same as the diameter of belt 66 where it passes around rolls 55 and 57. Under these conditions, the rolls 55, 57, 60, 62, 72 and 73 may be rotated at the same speed, while the rolls 71 and 91 (assuming that they have a diameter half that of the other rolls) may be rotated at twice the speed of the other rolls. To provide for the proper ratio of rotational speeds, the drawing illustrates the drive sprocket 88 of drive 90 to rolls 71, 91, as being appropriately larger in diameter than sprocket 92' on shaft 92. Furthermore, if it be assumed that the diameter of rolls 71, 91 is such that one full rotation thereof will correspond to one stage of advancement of the conveyor to advance the chain of packages the distance between successive packages, then the operating cam 105 of the parting blade operating unit E may be rotated at the same speed as roll 71, and the same relationship between the diameters of driving and driven sprockets 106 may be observed. Thus the cycle of operation of blade 21 will entail one downward movement and one return movement for each full rotation of rolls 71, 91. Similarly, the end sealing and cut-off units G and H, which are required to be actuated through one full cycle of operation for each full cycle of advancing and arrested movement of the conveyor and feed roll apparatus, will be operated by rotation of the cam 144 at the same speed as that of cam 105. Thus, to provide the proper ratio between speed rotation of cam 145 and speed of rotation of rolls 60, 62, 72, 73, the drive apparatus illustrated in Fig. 6 will involve a drive ratio in drive 103 such that the speed of rotation of cam 145 will be double that of the rolls 60, 62, 72 and 73.

In the operation of the machine, by proper adjustment of the speed of operation of the apparatus to that of the speed of operation of the driving machine to which it is attached, the nozzle unit A may be made effective to deliver a ribbon of ground meat of the selected thickness to the wrapper film 22 at the proper speed to match the slow speed of conveyor travel. It will be apparent that the ratio between the speeds of operation of the two machines must be adjusted in accordance with the thickness of the meat patties, i.e. the volume of meat utilized in the patties. This adjustment may be made by varying the speeds of operation of motors 74 and 82, both of which are variable speed motors. Alternatively, it may be taken care of by varying the speed of operation of the driving machine, or by making appropriate adjustments in the speeds of both machines.

The point where the jaw 132 and knife 151 of the end sealing and cut-off units G and H have just returned to their raised positions may be regarded as the starting of a cycle of operation for the purposes of this disclosure. The meat parting blade 21 is raised approximately simultaneously with the elevation of jaw 132 and blade 151. This frees the chain of meat packages 149 for advancing movement and simultaneously frees the ribbon of meat in nozzle 34 for ejection onto the wrapper 22. At this point, the drive to driving part 78 of clutch 79, which has dropped behind the driven part during the period of speed-up operation and has overtaken the driven part 81 in the period of arrested conveyor movement, will reestablish driving engagement with part 81 and the stage of relatively slow conveyor movement will be resumed, the ribbon of meat from nozzle 34 being deposited upon the wrapper 22 at the speed of travel of the conveyor belt. When this stage of slow forward movement has proceeded to an extent corresponding to the width of a meat pattie (in the direction of conveyor movement), the speed-up motor 82 which, during this stage of slow conveyor movement has been held in a non-driving position, will be tilted downwardly to establish driving engagement between drive disc 84 and clutch flange 85. Thereupon, the drive to the conveyor belt and feed roll apparatus, which, during the slow stage has been transmitted from motor 74 through drive sleeve 77 and overrunning clutch 79 to the drive shaft 86 and thence to the various drives 89, 90 and 97, will now be transferred to the speed-up drive. This drive proceeds directly from motor 82 through friction drive 84, 85 to the driven side of the clutch and thus directly to drive shaft 86, these parts rotating ahead of the drive part 78 of the clutch and the drive sleeve 77 and motor 74, which continue to operate at the slow speed for driving cams 105 and 144. The conveyor belt and roll apparatus being now driven at an accelerated rate, will move the wrapper 22 ahead at a faster rate than the rate of delivery of meat from nozzle 34, thus causing a gap to appear between the previously deposited meat patty nearest the nozzle 34 and the new section of the ribbon of meat issuing from the nozzle. Also, in the speed-up operation, the portion of wrapper 22 that is moved ahead at a faster rate than the feed from roll 22', will shorten the take-up loop 54 in the wrapper, raising the roller 53, and during the ensuing stage of operation, the loop 54 will gradually return to its normal depth under the forward feeding of roll 22', driven at a constant rate that is synchronized to the average rate of conveyor belt 23 in a complete cycle of conveyor movements.

The end of the speed-up stage of operation is effected by retraction of motor 82 away from its driving position, freeing the driven part 81 of clutch 79 from rotation, whereupon the load on the shaft 86 arising from the resistance of the various driven parts transmitted back through the drives 89, 90 and 97, will cause the movement of these driven parts to be arrested during the interval when the driving part 78 is overtaking the driven part 81 of the over-running clutch. In this interval, the forming and sealing jaw 132 will descend to form an end sealing web 136 between successive meat patties; the shear blade 151 will simultaneously descend to sever the web 136 between the two foremost packages 149; and the jaw 132 and blade 151 will then return to their elevated positions, at which point the driven or driving part 78 of the clutch 79 will overtake the driven part 81 and pick up the slow drive.

During the interval of arrested conveyor movement, the meat parting blade 21, which has remained in its lowered position throughout the interval of speed-up operation, will be raised to permit the ribbon of meat to again issue from the nozzle 34, and as the ribbon makes contact with the wrapper 22, the resumed slow operation of conveyor belt 23 will commence.

The wrapping and longitudinal sealing operations of unit F will continue through both the slow and speed-up conveyor movements.

I claim:
1. In a meat patty forming and wrapping apparatus for use with a meat grinding machine, in combination: a frame structure; an endless conveyor belt; driving rolls in the respective ends of said belt for supporting and driving the same; guide rolls arranged to provide, in the upper stretch of said belt, at least three longitudinally separated sections thereof arranged substantially in a common generally horizontal plane and providing a plurality of dips in said upper stretch, defining gaps in and below said plane; means to continuously feed a wrapper film onto the first belt section at one end of said belt; nozzle means to deposit a ribbon of meat on said wrapper film at said one end of the belt; means operating above said first belt section to fold the lateral portions of the wrapper around the sides of the meat in overlapping relation; means above the terminal portion of said first belt section to seal the overlapping portions of the wrapper to one another to form a tube in which the meat is contained; means for driving said belt intermittently in a manner to arrest the movement of said belt for short intervals of time; forming and sealing jaws operable in the gap between the first and second belt sections for relatively moving the upper and lower parts of the wrapper tube into contact with one another for sealing said parts together to form in said tube a series of spaced end seal webs and a series of sealed cells joined by said webs; and means operating in the gap between the second and third belt sections to cut said webs transversely of said tube to sever said cells in succession from said tube, thereby to form a series of separate meat packages for delivery from the other end of the conveyor belt; said intermittent drive means including an over-running clutch having a driving part and a driven part; a drive motor geared to said driving part for constantly driving the same at a relatively slow speed; a second driving motor and means for intermittently establishing a drive between said second drive motor and said driven part of the over-running parts for transmitting an accelerated drive to said driven part, bypassing said driving part; and a driving connection between said driven part of the clutch and said conveyor belt.

2. Apparatus as defined in claim 1, including means for intermittently operating said meat cutting knife, and drive means constantly driving said operating means from said first mentioned drive motor.

3. Apparatus as defined in claim 2, including drive means, constantly driven from said first drive motor, for intermittently actuating said sealing jaws and said web cutting means.

4. Apparatus as defined in claim 3, including means for operating said intermittent drive establishing means; and a direct driving connection between said means for actuating the sealing jaws and web cutting means and said last mentioned operating means.

References Cited in the file of this patent

UNITED STATES PATENTS

| | | |
|---|---|---|
| 2,649,035 | Cloud | Aug. 18, 1953 |
| 2,655,777 | Hagen | Oct. 20, 1953 |
| 2,691,257 | Vogt | Oct. 12, 1954 |